United States Patent [19]
Alth

[11] 3,753,017
[45] Aug. 14, 1973

[54] SELF STARTING, SINGLE-PHASE, SINGLE-COIL INDUCTION AND SYNCHRONOUS MOTOR

[76] Inventor: Max Alth, 6 Tamarack Rd., Port Chester, N.Y.

[22] Filed: Feb. 25, 1972

[21] Appl. No.: 229,265

[52] U.S. Cl................................. 310/163, 310/268
[51] Int. Cl. ...................................... H02k 19/14
[58] Field of Search............310/162–164, 166, 156, 254, 259, 218, 193, 268

[56] References Cited
UNITED STATES PATENTS

| 2,118,757 | 5/1938 | Bergstrom........................... | 310/166 |
| 1,668,365 | 5/1928 | Hall ..................................... | 310/163 |
| 2,378,556 | 6/1945 | Jeffers.............................. | 310/268 UX |
| 2,993,159 | 7/1961 | DeVol.............................. | 310/268 X |
| R23,155 | 10/1949 | Warren .............................. | 310/163 |
| 2,187,180 | 1/1940 | Schweitzer, Jr..................... | 310/163 |
| 630,333 | 8/1899 | Dietrich........................... | 310/164 X |
| 2,020,090 | 11/1935 | Weed............................... | 310/163 X |

*Primary Examiner*—D. F. Duggan

[57] ABSTRACT

The rotor may comprise a solid conductive disc, a slotted conductive disc, a conductive disc with a plurality of iron cores or permanent magnets equally spaced within the perimeter of said disc.

The stator is a solenoid with an iron core and two iron arms, parallel to each other, positioned above and below the rotor; the arms forming an almost complete circle within and following the perimeter of the rotor.

An AC field, originating within the solenoid, travels to the end of the solenoid's core arms. The flux lines are parallel to the rotor shaft and set up an apposing field within the conductive rotor causing it to rotate. Poles within the rotor sync with the ends of the core arms.

10 Claims, 6 Drawing Figures

PATENTED AUG 14 1973 3,753,017

SELF STARTING, SINGLE-PHASE, SINGLE-COIL INDUCTION AND SYNCHRONOUS MOTOR

BACKGROUND TO PRESENT DISCLOSURE

The present invention is a continuation of prior work that resulted in earlier patent applications:
Swing-field alternator
803 485, Feb. 28, 1969 Group 214 abandoned
Eddy-Current Brake
U.S. Pat. No. 3 567 976 03/02/71
Self-Start single phase motor
879 995 11/09/70 group 214 abandoned
Self-start Single Phase motor 105 381 01/11/71 Group 212, Claims granted 02/15/72
Improved alternator 04/02/70 251 117 Group 214 abandoned.

ADVANTAGES OF PRESENT INVENTION

The present invention is an improvement over the self-starting, single-phase induction-synchronous motor disclosed by this applicant 01/11/71, Ser. No. 105 380, Group 212, for which all claims have been granted but no patent number has been assigned at this writing.

The present motor (and the one that precedes it) differs from all other single-phase induction motors and single-phase synchronous motors in that it has but one coil. There are no shorted-turn shading poles, there is no split-phase winding with its attendant starting capacitor and starting (throw -out) switch. The motor herewith described, starts as an induction motor and upon attaining synchronous speed, locks into or with line frequency. Overloading does not stall the motor; it merely slows and adjusts to the load.

The present motor is suited to loads ranging from flea power ( clocks) to several horse power. Larger motors can be constructed by using several coils, and multiphase currents can be accomodated by using several coils.

FIG. 1 is a plan view of the basic motor
FIG. 2 is a cut-away view of FIG. 1
FIG. 3 is a two-coil arrangement of the same motor
FIG. 4 is a slotted rotor
FIG. 5 is a rotor with laminated iron cores
FIG. 6 is a solid, conductive disc rotor.

PRINCIPLE OF OPERATION

When an electric current is led through a solenoid wound on an iron core and said core ends are bent to form a long air gap, magnetic flux originates at the coil and moves outward until it reaches the end of the core ends. When a conductor is placed within said air gap, AC flux movement tends to drive the conductor away from the coil and towards the ends of the air gap. If the conductor is formed in the shape of a plate of metal, a stronger counter current is generated within the conductor and the effective force driving it out of the air gap becomes greater. If an iron rod is inserted orthagonal to the plate; the iron forms the core of a transformer secondary and the induced current is considerably increased.

In the present invention the AC flux is directed by the two long arms of the solenoid's core to travel around the circumference of a conductive disc. Thus each iron core is a small transformer secondary core and remains within the AC field for most of its journey around the center of the disc. Consider the motor coil the primary of a transformer, consider each iron core as the second leg of the same transformer and the conductive metal surrounding it as the secondary winding.

Synchronization occurs at the AC voltage zero point and a rotor core positioned approximately at the end of the pole arms. Sync speed at 60 Hertz would be 120 divided by the number of cores in the rotor or slots.

Referring to FIG. 1, which is a plan view of the basic, improved motor. The shaft is shown by 2, 3 indicates where a bearing member might be positioned, 4 is a pole arm, 5 is the conductive rotor, 6 is a permanent magnet, one of many similarly positioned and equally spaced about the circumference of the conductive disc 5. 7 is the stator coil which energizes the poles 4 and 4.

Referring to FIG. 2; the same numerals are used. Again 2 is the shaft, 4 is a pole, 6 is a permanent magnet, 5 is the conductive rotor and 7 is the stator coil.

When 7 is energized by an AC current, AC flux is propagated from the coil, across the air gap between the two pole arms 4 and 4 until it reaches the ends of the gap and poles. As can be seen in FIG. 2, PM 6 ( or a soft iron core) is effectively surrounded by a conductive coil, i.e., the metal of rotor disc 5. As can be realized,a repulsion current is induced in this low resistance circuit and the core 6 is driven away and in doing so, causes the rotor to turn.

The basic difference between this disclosure and the previous motor is the generally question mark shape of the poles. The cores 6 remain within the AC field for a considerably longer portion of the time. FIG. 3 illustrates the approach that is taken for a multi-horsepower motor or a motor with a large circumference rotor. This would be a design choice when high torque was desired. 11 is the shaft, 12 is the rotor, 13 one of a plurality of iron cores, or any magnetically permeable material, 16 and 17 are the stator coils and 14 and 15 are pole arms. The other pole arms being invisible from this view point.

The stator coils may be connected in series or parallel.

This arrangement could also be used for two-phase current, and three such pole arrangements could be used for three-phase. However, the benefit of two and three pairs of poles do not offset their complexity until the magnetic reluctance of the pole arms becomes inordinately great due to a very large rotor diameter.

As shown, solenoid core and pole arms are best made of laminated, magnetically permeable material. However, for low cost, low efficiency motors, the core and poles can be cast iron. Rotor can be aluminum or copper or any other electrically conductive material.

Figure 1:
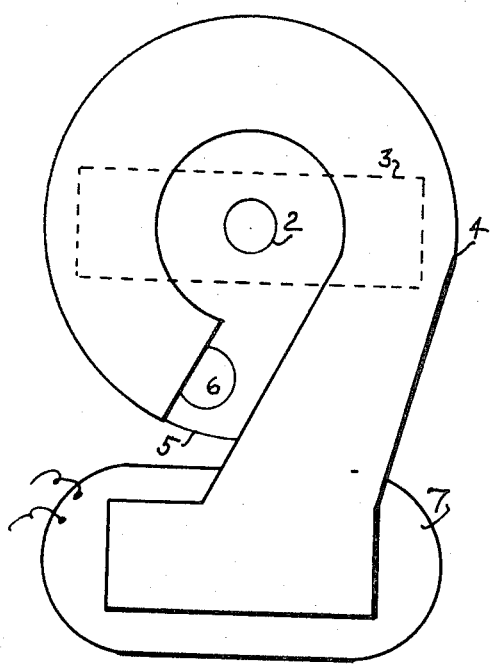
Figure 4:
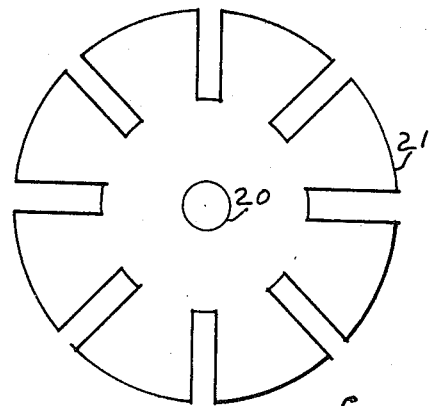
FIG. 4 is a slotted rotor providing some degree of synchronization and is useful for clock motors.
Figure 5:
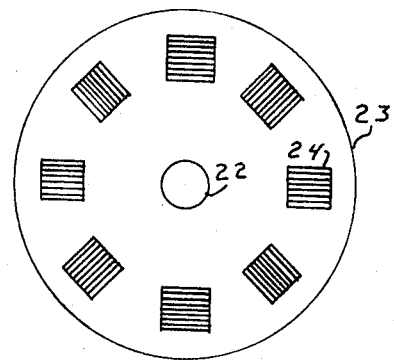
FIG. 5 shows the use of laminations for rotor cores or rotor poles.
Figure 2:
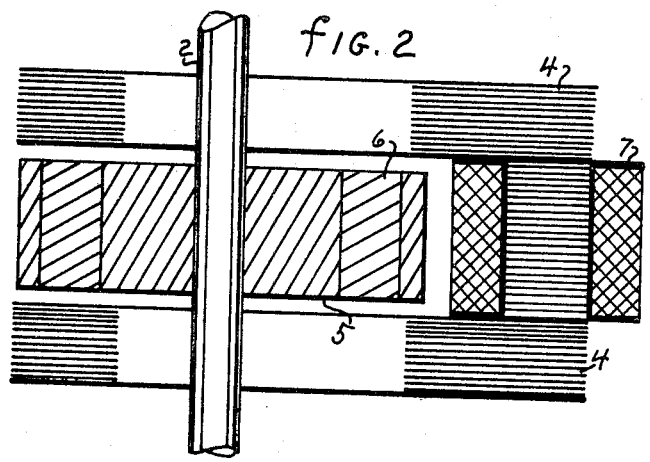
Figure 6:
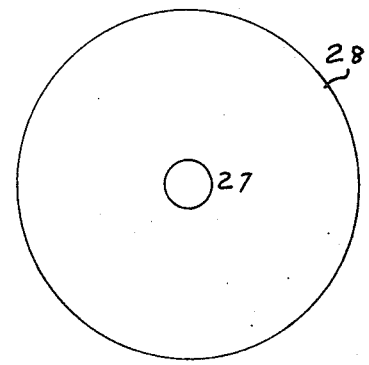
FIG. 6 shows a solid conductive disc rotor which would have no tendency to synchronize with line frequency but would find a rotational speed relating power input to load.
Figure 3:
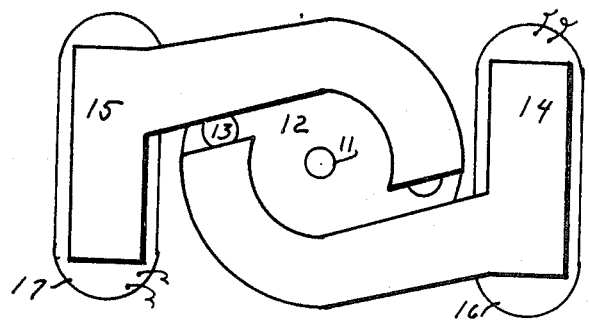

Having described my invention and its manner of manufacture, this is what I claim as new and novel and desire to secure by Letters Patent:

1. A single-phase motor comprising an electrically conductive means, generally circular in outline and fastened to a shaft means passing orthogonally through its center, a plurality of magnetically susceptible core means piercing said conductive means, said cores generally positioned a distance inward from edge of said conductive means and generally equidistant from each other and generally circular about said shaft means, said core means surrounded by conductive means cooperating with magnetic flux to provide rotation and synchronization; said flux generated by a solenoid having a magnetically permeable core terminating in two long arms parallel to each other and forming an almost complete circle within which said conductive means is positioned and free to rotate by virtue of bearing means.

2. A device as claimed in claim 1 wherein said electrically conductive means comprises a single disc of electrically conductive metal.

3. A device as claimed in claim 1 wherein said electrically conductive means comprises a single disc of electrically conductive metal, a plurality of permanent magnets, their magnetic axis parallel with said shaft means, said magnets circumferentially disposed, equidistant from one another about center of said electrical conductive means ,i.e., the rotor.

4. A device as claimed in claim 1 wherein said electrically conductive means comprises a single disc of electrically conductive metal, a plurality of iron cores circumferentially disposed, equidistant from one another about center of said electrical conductive means.

5. A device as claimed in claim 1 wherein said electrically conductive means comprises a single disc of electrically conductive metal a plurality of laminated iron cores circumferentially disposed, equidistant from one another about center of said electrical conductive means.

6. A device as claimed in claim 1 wherein said solenoid core and arms are of cast magnetically permeable material.

7. A device as claimed in claim 1 wherein said solenoid core and arms are of laminated magnetically permeable metal.

8. A device as claimed in claim 1 wherein said electrically conductive means comprises a single disc of electrically conductive metal radially slotted a plurality of times, each slot generally equidistant from each other, each slot originating a distance from said conductive means' center and extending completely to its circumference.

9. A device as claimed in claim 1 wherein a plurality of solenoids and associate core arms are used, said core arms sharing the circumference of the conductive means, less space between ends of said arms and solenoid origins.

10. A device as claimed in claim 1 wherein a plurality of solenoids and associate core arms are to be used, said core arms sharing the circumference of the conductive means, less space between said arms and solenoid origins, said solenoids to be connected to multiphase current in an accepted manner.

* * * * *